(12) United States Patent
Chang et al.

(10) Patent No.: US 10,636,444 B2
(45) Date of Patent: *Apr. 28, 2020

(54) HEAT ASSISTED MAGNETIC RECORDING WITH EXCHANGE COUPLING CONTROL LAYER

(71) Applicant: Seagate Technology LLC, Cupertino, CA (US)

(72) Inventors: Thomas Young Chang, Menlo Park, CA (US); Thomas P. Nolan, Fremont, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,313

(22) Filed: Feb. 20, 2019

(65) Prior Publication Data

US 2019/0180780 A1 Jun. 13, 2019

Related U.S. Application Data

(62) Division of application No. 15/793,635, filed on Oct. 25, 2017, now Pat. No. 10,269,381.

(51) Int. Cl.
| | |
|---|---|
| *G11B 5/66* | (2006.01) |
| *G11B 5/667* | (2006.01) |
| *G11B 5/31* | (2006.01) |
| *G11B 5/706* | (2006.01) |
| *G11B 5/00* | (2006.01) |

(52) U.S. Cl.
CPC .......... *G11B 5/667* (2013.01); *G11B 5/3133* (2013.01); *G11B 5/66* (2013.01); *G11B 5/70615* (2013.01); *G11B 5/70621* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,629,909 | A * | 5/1997 | Shiratori | G11B 11/10506 360/59 |
| 6,139,980 | A * | 10/2000 | Matsumoto | G11B 5/66 346/74.2 |
| 9,984,709 | B1 * | 5/2018 | Huang | G11B 5/66 |
| 2013/0295415 | A1 * | 11/2013 | Wang | G11B 5/66 428/828 |
| 2018/0082713 | A1 * | 3/2018 | Victora | G11B 5/012 |
| 2018/0197570 | A1 * | 7/2018 | Ikeda | G11B 5/667 |

* cited by examiner

*Primary Examiner* — William J Klimowicz
(74) *Attorney, Agent, or Firm* — Holzer Patel Drennan

(57) ABSTRACT

An apparatus includes a first magnetic layer. A second magnetic layer overlies the first magnetic layer and is magnetically softer than the first magnetic layer. An exchange control layer is between the first magnetic layer and the second magnetic layer. The includes a higher Ms (saturation magnetization) than the first magnetic layer at room temperature.

15 Claims, 4 Drawing Sheets

HEAT ASSISTED MAGNETIC RECORDING WITH EXCHANGE COUPLING CONTROL LAYER

CROSS-REFERENCE TO RELATED APPLICATIONS

This application is a divisional of prior application Ser. No. 15/793,635, filed Oct. 25, 2017.

SUMMARY

Provided herein is an apparatus including a first magnetic layer. A second magnetic layer overlies the first magnetic layer and is magnetically softer than the first magnetic layer. An exchange coupling control layer is between the first magnetic layer and the second magnetic layer. The exchange coupling control layer is magnetic and increases vertical exchange coupling between the first magnetic layer and the second magnetic layer.

Also provided herein is an apparatus including a first magnetic layer. A second magnetic layer overlies the first magnetic layer and is magnetically softer than the first magnetic layer. An exchange coupling control layer is between the first magnetic layer and the second magnetic layer. The exchange coupling control layer includes a higher Ms (saturation magnetization) than the first magnetic layer and the second magnetic layer at the writing temperature.

Also provided herein is an apparatus including a write head operable to produce a magnetic field. A first magnetic layer is also provided wherein the magnetic field is insufficient to change a magnetization of the first magnetic layer at room temperature. A second magnetic layer overlies the first magnetic layer. The second magnetic layer is magnetically softer than the first magnetic layer. An exchange control layer is between the first magnetic layer and the second magnetic layer. The magnetic field is sufficient to change the magnetization of the second magnetic layer at a Tc (Curie temperature) of the exchange control layer.

These and other features and advantages will be apparent from a reading of the following detailed description.

DESCRIPTION

Figure 1:
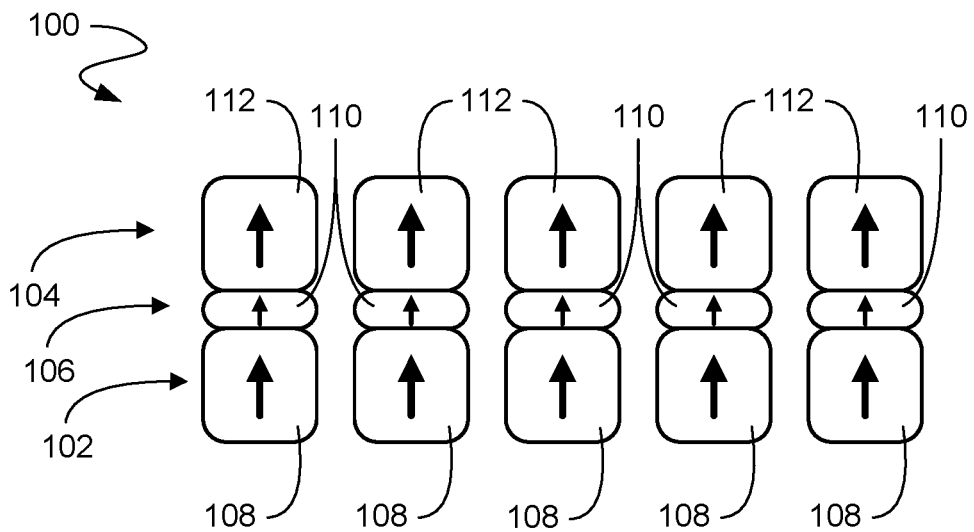
FIG. 1 shows a heat assisted magnetic recording media including a hard magnetic layer, a soft magnetic layer, and an exchange coupling control layer according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

Perpendicular magnetic recording ("PMR") media may include a PMR exchange coupling control layer that separates softer and harder magnetic layers. The PMR exchange coupling control layer is a weakly magnetic or non-magnetic breaklayer that reduces vertical exchange coupling between the soft and hard magnetic layers of the PMR structure. However, such a PMR exchange coupling control layer may be detrimental to heat assisted magnetic recording ("HAMR") media, wherein the switching temperature during the writing process is far higher than the room temperature writing process of PMR. Although the room temperature anisotropy and thermal stability of HAMR recording layers is generally much higher than that of conventional PMR recording layers, at the onset of switching in HAMR, magnetic moment (Ms), anisotropy energy (KuV), and vertical exchange coupling (J) are all lower than the comparable values during switching in a conventional PMR recording process.

It has been unexpectedly discovered that, instead of decreasing vertical coupling (as is generally desired for PMR), HAMR media instead benefits from increasing vertical exchange coupling between softer and harder magnetic layers. As such, a HAMR exchange coupling control layer may include a higher saturation magnetization ("Ms") and/or higher Curie temperature ("Tc") than the hard recording layer of the HAMR media.

Referring now to FIG. 1, a HAMR media 100 including a hard magnetic layer 102, a soft magnetic layer 104, and an exchange coupling control layer ("ECL") 106 is shown according to one aspect of the present embodiments. For clarity of illustration, other layers of the HAMR media 100 are not illustrated, but are understood to be present (e.g. substrate, SUL, seed layer, heatsink, overcoat, etc.). The hard magnetic layer 102 is granular and includes hard layer magnetic grains 108 that are separated by segregant (not shown). For example, in various embodiments the hard layer magnetic grains 108 may include one or more L10 FePt containing alloys.

The ECL 106 overlies the hard magnetic layer 102. The ECL 106 is granular and includes ECL layer magnetic grains 110 that are separated by segregant (not shown). For example, in various embodiments the ECL layer magnetic grains 110 may include an L10 Fe—Pt based alloy, an Fe—Pd based alloy, Co—Pt based alloy, Co—Pd based alloy, or FePtCo. In addition, the ECL 106 may be relatively thin with respect to the hard magnetic layer 102 and the soft magnetic layer 104. For example, the ECL 106 may be less than 2 nm thick in the vertical direction. In some embodiments the ECL 106 may be strongly magnetic. The ECL 106 can include segregant or not include segregant. The ECL 106 can be granular or amorphous. The ECL 106 can be a single layer or multiple layers. Each layer can comprise any of the four combinations of crystal or amorphous, segregant or no segregant. Each layer of the ECL 106 may include a co-containing alloy, an Fe—containing alloy, an ordered alloy, a partially ordered alloy, a disordered alloy, etc. The segregant may be C or a carbide, BN, boride, nitride, oxide, etc. or a combination thereof.

In some embodiments, the ECL 106 and the hard magnetic layer 102 may include ordered L10 alloys. The ECL 106 may include a higher concentration of Fe+Co than the hard magnetic layer 102, and the ECL 106 may comprise Cu. The ECL 106 may also include an L10 alloy with a higher ratio of Fe+Co:Pt than the bottom sublayer of the hard magnetic layer 102 and the top sublayer of the soft magnetic layer 104 in direct contact to the ECL 106. In various embodiments, the hard magnetic layer 102, the soft magnetic layer 104, and the ECL 106 all include ordered L10 alloys. In some embodiments of ordered L10 ECL 106, grain-to-grain vertical coupling uniformity and switching temperature uniformity are improved by reducing and diluting segregant concentrations to increase grain core moment and volume. In some embodiments of ordered L10 ECL 106, grain-to-grain vertical coupling uniformity and switching temperature uniformity are improved by lowering ordering temperature with additions such as Ag and Cu so as to improve ordering and thereby uniformity of properties. In other embodiments, the soft magnetic layer 104 and the ECL 106 include disordered Co-containing hcp or fcc alloys. ECL 106 has a higher Co % concentration, resulting in higher moment Ms than soft layer 104. Higher moment in ECL 106 may be achieved by lower concentration of segregant as well as lower concentration of common hcp Co-alloy grain moment diluting elements including Cr, Pt, Ru, Cu. In further embodiments, ECL 106 comprises an Fe—Co alloy including amorphizing agents such as Ta, B, W, Cr, and Nb forming a thin, high moment, low thermal conductivity layer that further provides a template for continued growth of an hcp <0001> oriented Co-alloy soft layer 104.

As discussed above, the ECL 106 increases vertical exchange coupling between the hard magnetic layer 102 and the soft magnetic layer 104. In various embodiments, the ECL 106 includes a higher Ms and/or higher Tc than the hard magnetic layer 102 and the soft magnetic layer 104 at the onset temperature of the HAMR recording process. As a result, exchange spring strength is increased between the hard magnetic layer 102 and the soft magnetic layer 104.

The soft magnetic layer 104 overlies the ECL 106. The soft magnetic layer 104 is granular and includes soft layer magnetic grains 112 that are separated by segregant (not shown). For example, in various embodiments the soft layer magnetic grains 112 may include CoCrPt. Such hcp or fcc Co-containing alloy soft layer 104 will generally be significantly magnetically softer than an L10 ordered Fe—Pt based hard magnetic layer 102. In other various embodiments, the soft magnetic layer 104 may also comprise an ordered L10 Fe—Pt containing alloy that is softened by reduced ordering, for example by replacing Fe and/or Pt with an element like Co, Cu, Ru, Ag, or even Fe or Pt to move off of stoichiometry.

For clarity of illustration, the magnetizations of the hard layer magnetic grains 108, the ECL layer magnetic grains 110, and the soft layer magnetic grains 112 are depicted by up and down arrows. Therefore, the hard layer magnetic grains 108, the ECL layer magnetic grains 110, and the soft layer magnetic grains 112 are perpendicularly magnetically oriented, as depicted by the up and down arrows. The magnetic easy axis of the hard layer is vertical as well, and that it may be preferable but is not necessary that the magnetic easy axis of the soft layer also be vertical, as long as the applied field and the room temperature exchange coupling are both sufficient to maintain the soft layer magnetization in a vertical orientation. It will be further described that the ECL 106 will in some embodiments control the soft layer easy axis orientation as well as the vertical coupling strength between hard layer 108 and soft layer 104. It is understood that magnetization orientations may also be referred to as positive (+), negative (−), north pole, south pole, etc. However, it is understood that such magnetic representations are simplifications indicating, for example, the general location from which magnetic field lines emerge and reenter.

As illustrated, the hard layer magnetic grains 108, the ECL layer magnetic grains 110, and the soft layer magnetic grains 112 form granular columns. The granular columns are separated by boundaries of segregant (not shown) that are non-magnetic spacers. In various embodiments, the boundaries may be, for example, one of a combination of oxides, carbides, borides and nitrides (e.g. $SiO_2$, $TiO_2$, $B_2O_3$, BN, C, etc.). The boundaries segregate the granular columns by physically separating and therefore magnetically decoupling the granular columns from each other. As such, the granular columns are parallel and horizontal to each other with respect to overlying and underlying layers, and the magnetization of the granular columns is perpendicular to the overlying and underlying layers.

Figure 2:
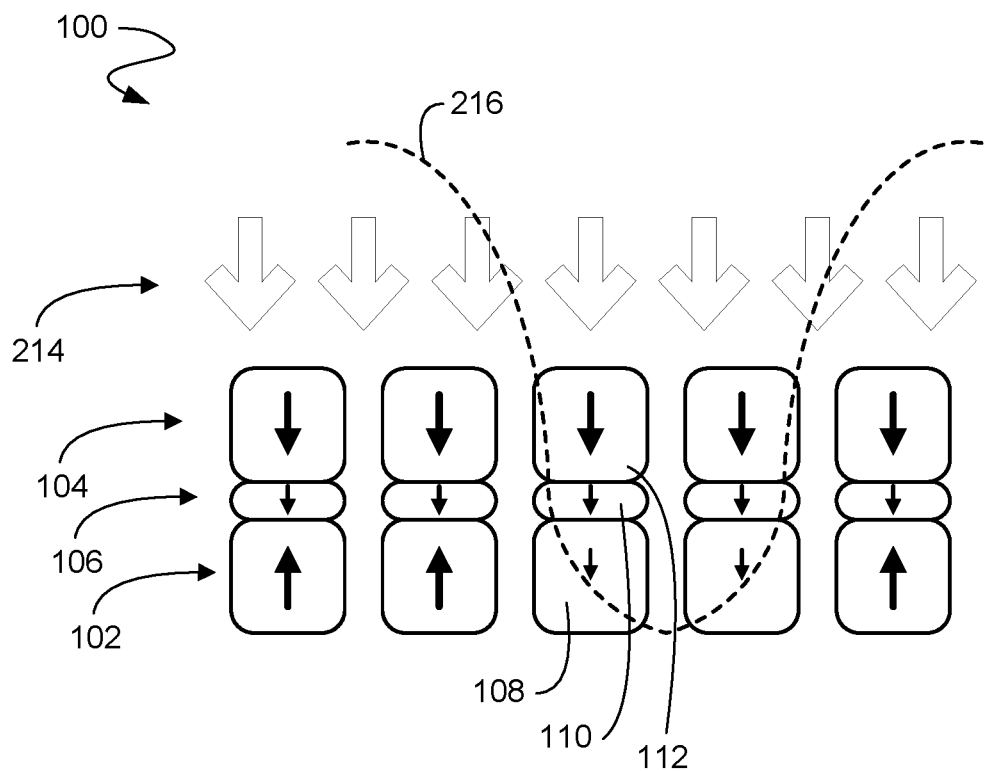
FIG. 2 shows the heat assisted magnetic recording media undergoing a writing process according to one aspect of the present embodiments.

Referring now to FIG. 2, the HAMR media 100 undergoing a writing process is shown according to one aspect of the present embodiments. It is understood that for clarity of illustration, only a portion of the HAMR media 100 is depicted. A write head (not shown) produces and applies a magnetic field 214 and heat 216 to portions of the hard magnetic layer 102, the soft magnetic layer 104, and the ECL 106. As illustrated, in various embodiments the magnetic field 214 affects a larger area of the HAMR media 100 than the heat 216.

In response to the magnetic field 214, the soft magnetic layer 104 and the ECL 106 change magnetization from up to down at a range of temperatures below their Curie temperatures that includes the range of switching temperatures between onset of switching and below freezing of the hard layer 108, often including temperatures such as room temperature. Onset of switching refers to the highest temperature at which the first grains of the recording hard layer can be irreversibly switched by the combination of Zeeman energy from an applied field and any torque applied to the hard layer through exchange coupling or magnetostatic forces. The onset temperature is generally a few degrees below Tc of the highest Tc grains of the hard layer, so that those grains have some moment for Zeeman energy to act upon and some Hk to provide stability (KuV) to avoid rapid thermal reversal (erasure). The freezing temperature is the lowest temperature where the lowest Tc grains of the hard layer are far enough below their Tc that their Hk has increased significantly above the applied field so that the combination of switching forces is no longer able to rotate the magnetization of any hard layer magnetic grains.

However, the magnetic field 214 is insufficient to change the magnetization of the hard magnetic layer 102 at room temperature or any temperature below the freezing temperature of the hard layer. On the other hand, the heat 216 affects a smaller portion of the HAMR media than the magnetic field 214. In the area affected by the heat 216, the magnetic anisotropy field ("Hk") and the Ms of the magnetic grains are reduced as the magnetic grains approach their Tc. In some embodiments, the soft layer magnetic grains 112 and the ECL layer magnetic grains 110 have a higher Tc than the hard layer magnetic grains 108. As such, at the Tc of the hard layer magnetic grains 108 the Hk and Ms of the hard layer magnetic grains 108 will be reduced to zero while the ECL layer magnetic grains 110 and the soft layer magnetic grains 112 still exhibit magnetic properties. As the hard layer magnetic grains 108 continue to cool below Tc, the Hk and Ms of the hard layer magnetic grains 108 begin to increase. While the Hk and Ms of the hard layer magnetic grains 108 are still low, the thin ECL layer magnetic grains 110 increase the exchange coupling torque between the switched soft layer grains 112 and the unswitched hard layer grains 108; and thereby increase the driving force to switch the magnetization direction of the hard layer magnetic grains 108 and increase the thermal stability of the hard layer magnetic grains 108. As such, the ECL layer magnetic grains 110 help to ensure that the hard layer switching occurs and helps to avoid thermal un-switching after the switch happens. For example, in FIG. 2 switching is depicted by the hard layer magnetic grains 108 switching from an up arrow to a down arrow, and un-switching is understood to refer to an instance of the down arrow flipping back to an up arrow. Therefore, in various embodiments the magnetic field 214 along with the increased driving force of the exchange coupling through the ECL 106 are sufficient to change the magnetization of the hard magnetic layer 102 just below the Tc of the hard layer 102. As the hard layer magnetic grains 108 continue to cool, the Hk and Ms of the hard layer magnetic grains 108 continue to increase until the hard layer magnetic grains 108 reach a freezing temperature, at which point Hk is so high that the magnetization direction of the hard layer magnetic grains 108 is frozen and will not change in response to the magnetic field 214. The freezing temperatures of the soft layer 104 and the ECL 106 are generally much lower than that of the hard layer and do not play a major role in the freezing process.

Figure 3:
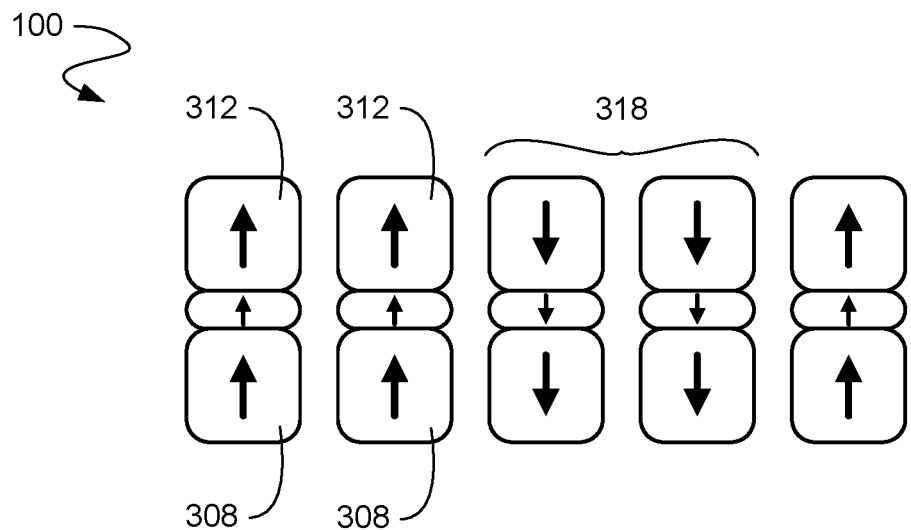
FIG. 3 shows the heat assisted magnetic recording media after removal of the heat according to one aspect of the present embodiments.

Referring now to FIG. 3, the HAMR media 100 after removal of the heat is shown according to one aspect of the present embodiments. After removal of the heat 216 (FIG. 2), the previously heated magnetic grains 318 cool and are locked into the direction of the magnetic field 214 (FIG. 2). As the heat 216 and the magnetic field 214 are removed, the unheated soft layer magnetic grains 312 realign to the unheated hard layer magnetic grains 308.

Figure 4:
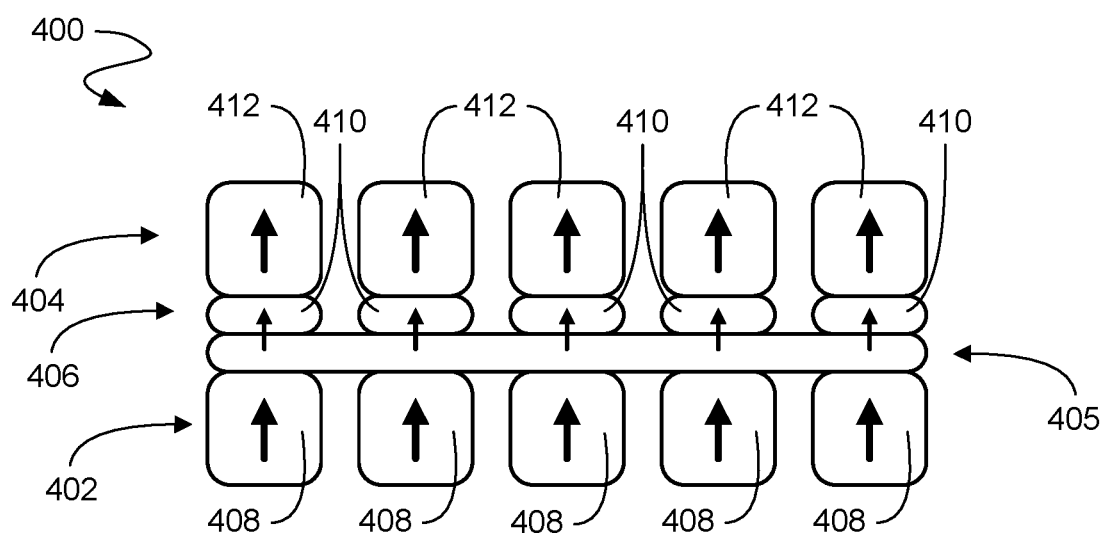
FIG. 4 shows a heat assisted magnetic recording media including a hard magnetic layer, a soft magnetic layer, an amorphous exchange coupling control layer, and a granular exchange coupling control layer according to one aspect of the present embodiments.

Referring now to FIG. 4, a HAMR media 400 including a hard magnetic layer 402, a soft magnetic layer 404, an amorphous ECL 405, and a granular ECL 406 is shown according to one aspect of the present embodiments. For clarity of illustration, other layers of the HAMR media 400 are not illustrated, but are understood to be present (e.g. substrate, SUL, seed layer, heatsink, overcoat, etc.). The HAMR media 400 is similar to the HAMR media 100, with the addition of the amorphous ECL 405.

The hard magnetic layer 402 is granular and includes hard layer magnetic grains 408 that are separated by segregant (not shown). For example, in various embodiments the hard layer magnetic grains 408 may include FePt or an alloy thereof. In various embodiments, the hard layer magnetic grains 408 may include an ordered L10 Fe—Pt containing alloy that may be softened by reduced ordering, for example by replacing Fe and/or Pt with an element like Co, Cu, Ru, Ag, or even Fe or Pt to move off of stoichiometry.

The amorphous ECL 405 is a continuous magnetic layer that overlies the hard magnetic layer 402. In various embodiments the amorphous ECL 405 may be a Co-containing alloy that may further include Fe, Pt, and amorphizing agents (e.g. Ta, W, B, Nb, Zr, etc.). The amorphous ECL 405 may have a saturation magnetic moment up to about 1.5 T and have a thickness less than about 3 nm. The amorphous ECL 405 forms an amorphous growth template on the hard magnetic layer 402.

The optional granular ECL 406 overlies the amorphous ECL 405. The granular ECL 406 is granular and includes ECL layer magnetic grains 410 that are separated by segregant (not shown). For example, in various embodiments the ECL layer magnetic grains 410 may include FePtCo. In various embodiments, the ECL layer magnetic grains 410 may include an ordered L10 Fe—Pt containing alloy that may be softened by reduced ordering, for example by replacing Fe and/or Pt with an element like Co, Cu, Ru, Ag, or even Fe or Pt to move off of stoichiometry. In addition, the granular ECL 406 may be relatively thin with respect to the hard magnetic layer 402 and the soft magnetic layer 404. For example, the granular ECL 406 may be less than 2 nm thick in the vertical direction. The granular ECL 406 has moment Ms higher than that of soft layer 404 or hard layer 402.

The soft magnetic layer 404 overlies the granular ECL 406. The soft magnetic layer 404 is granular and includes soft layer magnetic grains 412 that are separated by segregant (not shown). For example, in various embodiments the soft layer magnetic grains 412 may include CoCrPt. Such hcp or fcc Co-containing alloy soft layer 404 will generally be significantly magnetically softer than an L10 ordered Fe—Pt based hard magnetic layer 402. In various embodiments, the soft magnetic layer 404 may also comprise an ordered L10 Fe—Pt containing alloy that is softened by reduced ordering, for example by replacing Fe and/or Pt with an element like Co, Cu, Ru, Ag, or even Fe or Pt to move off of stoichiometry.

Figure 5:
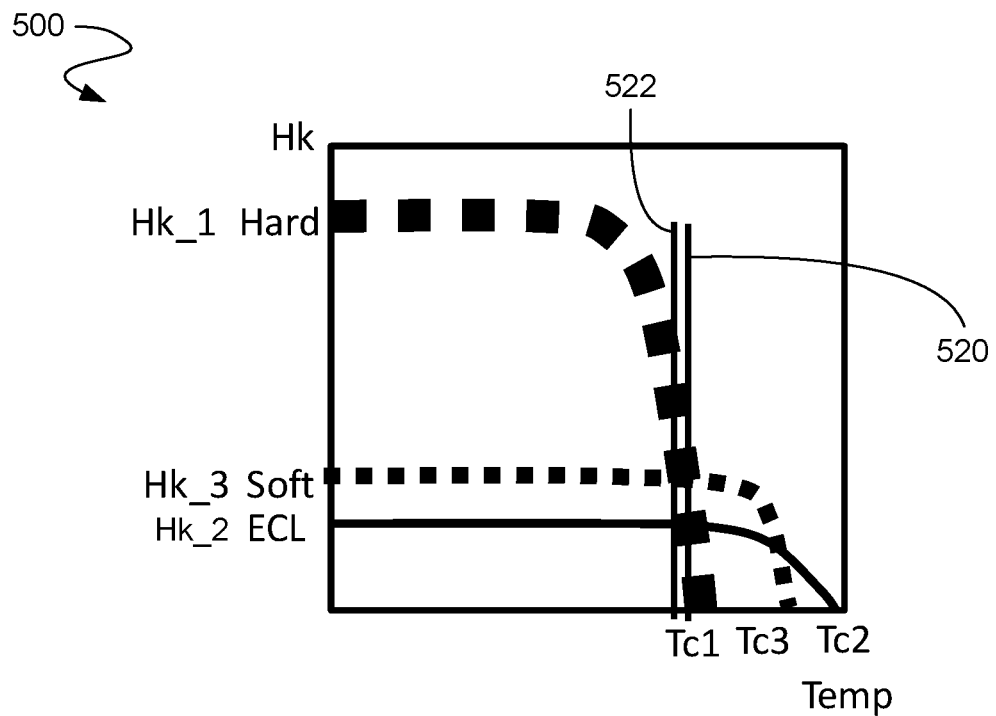
FIG. 5 shows a graph illustrating the effect of temperature on Hk in various layers of a heat assisted magnetic recording media according to one aspect of the present embodiments.

Referring now to FIG. 5, a graph 500 illustrating the effect of temperature on Hk in various layers of a HAMR media is shown according to one aspect of the present embodiments. The graph 500 illustrates some embodiments wherein the hard magnetic layer 102 (FIG. 1) includes a high Hk at room temperature, as indicated by the line Hk_1 Hard 502, that is higher than both the soft magnetic layer 104 (FIG. 1) and the ECL 106 (FIG. 1). Both the soft magnetic layer 104, as indicated by line Hk_3 Soft 504, and the ECL 106, as indicated by line Hk ECL 506 include a lower Hk than the hard magnetic layer 102. FIG. 5 shows a case where ECL 106 has lower Hk at room temperature than the soft magnetic layer 104, but these relative values can be reversed in various embodiments. The width of the line Hk_1 Hard 506 schematically indicates that the hard layer grains 108 have a range of values of Tc that result in a range of switching onset and freezing temperatures. Such variation reduces the ability to get all grains to initiate and complete the switching process in a selected, desired narrow temperature window, thereby reducing transition sharpness and limiting recording density. The various embodiments of the ECL enable adjustment of this switching temperature window to improve recording performance. Some embodiments provide higher onset temperature, enabling a longer time for more complete switching based on the same fixed temperature cooling profile defined by the head. Some embodiments further delay the onset of the highest Tc hard layer grains relative to the lower Tc hard layer grains, thereby reducing the effect of grain to grain variation of Tc (sigma Tc), thereby narrowing the switching temperature window and enabling increased transition sharpness.

The graph 500 also illustrates that in some embodiments the hard magnetic layer 102 includes a Tc, as indicated by Tc1, that is lower than both Tc3 of the soft magnetic layer 104 and Tc(ecl) of the ECL 106. FIG. 5 shows a case where Tc_2 ECL is higher than Tc3 soft, but these relative values can be reversed in various embodiments.

It is understood that in various embodiments the Hk of the ECL 106 may be higher or lower than the Hk of the soft magnetic layer 104. Some embodiments employ a higher Hk of the ECL 106, as that can correspond to higher Ku, exchange stiffness, and vertical coupling strength.

In further embodiments, hard magnetic layer 102 and/or the soft magnetic layer 104 may include at least two sublayers. The sublayers may include different magnetic values (e.g. Tc, sigma Tc, Ms, etc.). In some embodiments, the ECL may include a less than 3 nm amorphous layer having Ms between 700-1400 emu/cc and a less than 3 nm crystalline hcp layer having Ms between 700-1400. In some preferred embodiments amorphous or crystalline layers or sublayers of ECL 106 are less than 2 nm thick.

In the presence of an applied magnetic field (not shown), switching of the magnetization in the hard magnetic layer 102 begins at a temperature below Tc1, as indicated by vertical line 520, while the Hk of the hard magnetic layer 102 is relatively low. As the temperature continues to drop, the Hk of the hard magnetic layer 102 increases until it reaches freezing temperature, as indicated by vertical line 522, at which point switching no longer takes place. At the freezing temperature, the magnetization of the hard magnetic layer 102 is locked, and will no longer change in the presence of the applied magnetic field. The vertical exchange coupling between hard layer 102 and soft layer 104, enhanced by ECL 106 increases the effective moment and thermal stability of hard layer 102 as well as increases the driving force for magnetic rotation of hard layer 102; all of which increase the onset temperature 520 at which the hard layer 102 begins to switch. This earlier higher temperature onset increases the temperature window and correspondingly the likelihood that grains will switch as desired before the freezing temperature is reached.

Figure 6:
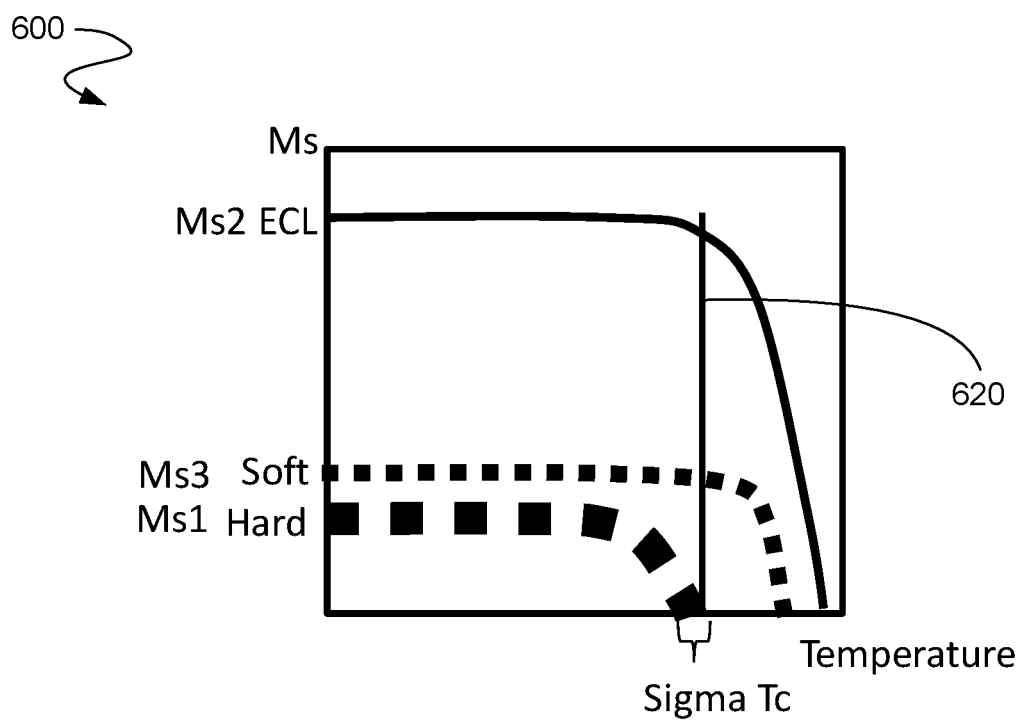
FIG. 6 shows a graph illustrating the effect of temperature on Ms in various layers of a heat assisted magnetic recording media according to one aspect of the present embodiments.

Referring now to FIG. 6, a graph 600 illustrating the effect of temperature on Ms in various layers of a HAMR media is shown according to one aspect of the present embodiments. The graph 600 illustrates some embodiments wherein the ECL 106 (FIG. 1) includes a high Ms at room temperature, as indicated by the line Ms2 ECL, that is higher than both the soft magnetic layer 104 (FIG. 1) as indicated by the line Ms3 Soft and the hard magnetic layer 102 (FIG. 1) as indicated by the line Ms1 Hard. FIG. 6 shows a case where Ms3 Soft is higher than Ms1 Hard, but these relative values can be reversed in various embodiments.

The graph 600 also illustrates that in some embodiments the hard magnetic layer 102 includes a Tc that is lower than both the soft magnetic layer 104 and the ECL 106. FIG. 6 shows a case where Tc3 Soft is lower than Tc2 ECL, but these relative values can be reversed in various embodiments. In various embodiments, the ECL 106 includes a higher Ms than the soft magnetic layer 104 at the Tc of the hard magnetic layer 102, and most importantly, in the range of temperatures between the onset and freezing temperatures of the hard layer.

In various embodiments, it may be desirable for the ECL 106 to include a low sigma Tc. In some embodiments, the sigma Tc of the ECL 106 may be lower than sigma Tc of the soft magnetic layer 104 and sigma Tc of the hard magnetic layer 102. In further embodiments, the segregant concentration of the ECL 106 is lower than that of the hard magnetic layer 102 so as to increase Ms and reduce sigma Tc. In other embodiments, the Fe:Pt ratio of the ECL 106 is closer to 1:1 than the hard layer, in order to improve ordering and reduce sigma Tc. In other embodiments the ordering temperature of ECL 106 is lowered so as to increase ordering and lower sigma Tc. Several elements including Cu and Ag are known to reduce ordering temperature in FePt.

In the presence of an applied magnetic field (not shown), switching onset of the magnetization in the hard magnetic layer 102 begins at somewhat below the Tc of the highest Tc grains 108 of the hard magnetic layer 102, as indicated by vertical line 620, while the Ms of the hard magnetic layer 102 is relatively low. Within the hard magnetic layer 102, various grains may switch at slightly different Tc values. For example, some grains may begin to switch at higher temperatures and some grains may not switch until a lower temperature is reached. Such a variation is indicated within the graph 600 by Sigma Tc. As a result, switching may begin at a range of temperatures below Tc+sigma Tc of the hard magnetic layer 102, and successful switching may occur for each grain during the period of time that the disk cools, extending over a range of cooler temperatures until the freezing temperature is reached. The success rate and corresponding transition quality depends on the amount of time and the strength of the driving force that directs the grains to switch during this cooling process.

Figure 7:
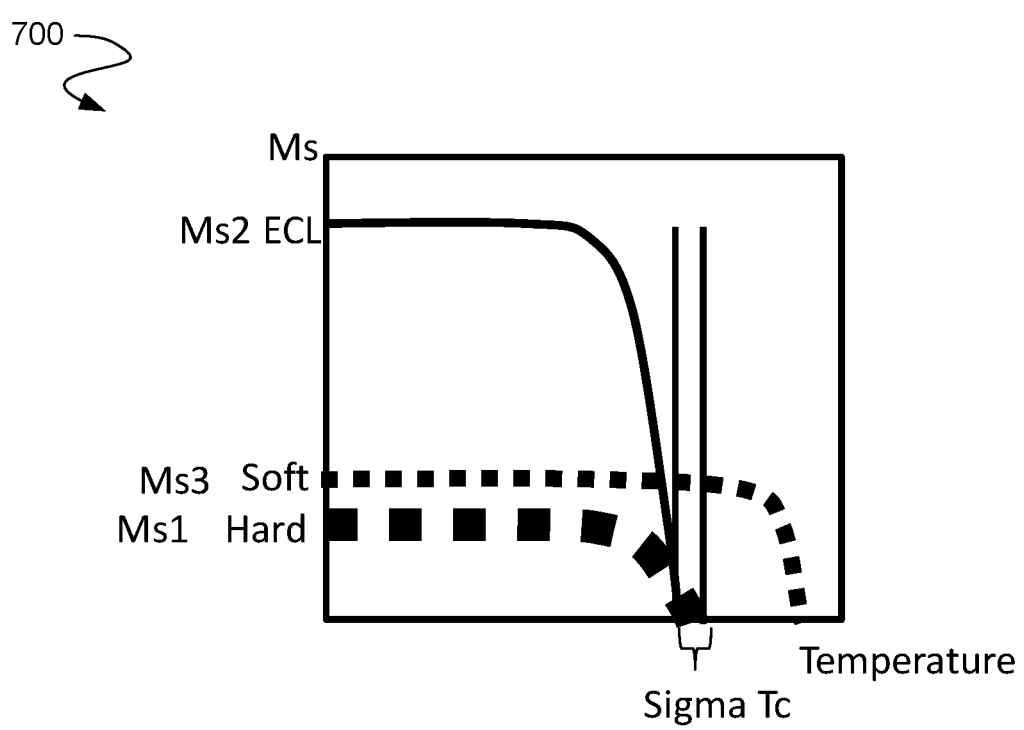
FIG. 7 shows a graph illustrating delayed switching of the highest Tc grains of the hard magnetic layer according to one aspect of the present embodiments.

Referring now to FIG. 7, a graph 700 illustrating delayed switching of the hard magnetic layer 102 (FIG. 1) is shown according to one aspect of the present embodiments. Similar to FIG. 6, the graph 700 illustrates some embodiments wherein ECL 106 (FIG. 1) includes a higher Ms. In some preferred embodiments room temperature Ms ECL is even higher than the similar embodiments of FIG. 6 so as to increase the rate of rise of Ms ECL and resulting vertical exchange coupling between hard layer 102 and soft layer 104, as temperature is decreased below Tc ECL.

On the other hand, the graph 700 illustrates Tc values that are different from FIG. 6. In various embodiments the ECL 106 includes a Tc that is lower than the soft magnetic layer 104 and similar to or lower than the hard magnetic layer 102. The hard magnetic layer 102 includes a Tc that is lower than the soft magnetic layer 104 and similar to or higher than the ECL 106. The soft magnetic layer 104 includes a Tc that is higher than both the hard magnetic layer 102 and the ECL 106. In various embodiments, the ECL 106 includes a lower Ms than the soft magnetic layer 104 at Tc+sigma Tc of the hard magnetic layer 102. In various embodiments, the ECL 106 may include a Tc value that is 0-50 degrees lower than the hard magnetic layer 102. In further embodiments, hard magnetic layer 102 and/or the soft magnetic layer 104 may include at least two sublayers. The sublayers may include different magnetic values (e.g. Tc, sigma Tc, Ms, etc.). The ECL 106 may have a similar or lower Tc than a top sublayer of the hard magnetic layer 102, wherein the ECL 106 is in direct contact to the top sublayer and a bottom sublayer of the soft magnetic layer 104. In some embodiments of ECL 106, Tc is reduced below that of hard layer 102 by including a higher concentration of Tc reducing elements such as Cu and Ru. In such manner and in combination with reduced segregant or moment diluting elements, or increased Fe or Co concentration, an ECL having higher vertical coupling, lower Tc, and narrower sigma Tc than the top sublayer of hard layer 102 can be achieved. Large sigma Tc of the hard magnetic layer 102 may be damaging to recording performance. In various embodiments, it may be desirable for the ECL 106 to include a low sigma Tc, particularly in embodiments where the Tc of the ECL 106 is less than the Tc of the hard magnetic layer 102. The ECL 106 may include Ag to lower the ordering temperature and improve sigma Tc. In various embodiments, it may be desirable for the ECL 106 to include a very high Ms, particularly in embodiments where the Tc of the ECL 106 is less than the Tc of the hard magnetic layer 102. In such embodiments, the onset temperature of the highest Tc grains of the hard layer is relatively reduced because the ECL does not couple the hard layer to the soft layer above Tc ECL, while lowest Tc grains of the hard layer have relatively higher onset temperature because coupling between the hard and soft layers is turned on near Tc ECL, which is closer to Tc hard−sigma than it is to Tc hard+sigma.

In the presence of an applied magnetic field (not shown), switching onset of the magnetization in the hard magnetic layer 102 no longer begins at the Tc of the hard magnetic layer 102. Instead, switching onset is delayed toward the Tc of the ECL 106, at a temperature below the Tc of the hard magnetic layer 102. Such a delayed switching onset increases uniformity of switching. Sigma T onset can be made less dependent upon sigma Tc hard, and thus be reduced to a narrower range.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
   a first magnetic layer;
   a second magnetic layer overlying the first magnetic layer, wherein the second magnetic layer is magnetically softer than the first magnetic layer; and
   an exchange control layer between the first magnetic layer and the second magnetic layer, wherein the exchange control layer includes a higher Ms (saturation magnetization) than the first magnetic layer at room temperature, wherein the second magnetic layer includes an ordered L10 Fe—Pt containing alloy.

2. The apparatus of claim 1, wherein the exchange control layer includes a Tc value that is 0-50 degrees lower than the first magnetic layer.

3. The apparatus of claim 1, wherein the exchange control layer includes a higher Ms than the second magnetic layer at a Tc of the first magnetic layer.

4. The apparatus of claim 1, wherein the exchange control layer includes an Fe—Co alloy including amorphizing agents Ta, B, W, Cr, or Nb.

5. The apparatus of claim 1, wherein the exchange control layer includes a higher Tc than the first magnetic layer.

6. The apparatus of claim 1, wherein the exchange control layer includes a lower Tc than the first magnetic layer.

7. An apparatus comprising:
   a first magnetic layer;
   a second magnetic layer overlying the first magnetic layer, wherein the second magnetic layer is magnetically softer than the first magnetic layer; and
   an exchange control layer between the first magnetic layer and the second magnetic layer, wherein the exchange control layer includes a higher Ms (saturation magnetization) than the first magnetic layer at room temperature, wherein the exchange control layer includes a higher Ms than the second magnetic layer at a Tc of the first magnetic layer.

8. The apparatus of claim 7, wherein the exchange control layer includes a Tc value that is 0-50 degrees lower than the first magnetic layer.

9. The apparatus of claim 7, wherein the exchange control layer includes an Fe—Co alloy including amorphizing agents Ta, B, W, Cr, or Nb.

10. The apparatus of claim 7, wherein the exchange control layer includes a higher Tc than the first magnetic layer.

11. The apparatus of claim 7, wherein the exchange control layer includes a lower Tc than the first magnetic layer.

12. An apparatus comprising:
    a first magnetic layer;
    a second magnetic layer overlying the first magnetic layer, wherein the second magnetic layer is magnetically softer than the first magnetic layer; and
    an exchange control layer between the first magnetic layer and the second magnetic layer, wherein the exchange control layer includes a higher Ms (saturation magnetization) than the first magnetic layer at room temperature, wherein the exchange control layer includes an Fe—Co alloy including amorphizing agents Ta, B, W, Cr, or Nb.

13. The apparatus of claim 12, wherein the exchange control layer includes a Tc value that is 0-50 degrees lower than the first magnetic layer.

14. The apparatus of claim 12, wherein the exchange control layer includes a higher Tc than the first magnetic layer.

15. The apparatus of claim 12, wherein the exchange control layer includes a lower Tc than the first magnetic layer.

* * * * *